United States Patent
Chrobaczek et al.

(10) Patent No.: US 7,037,440 B2
(45) Date of Patent: May 2, 2006

(54) COMPOSITIONS COMPRISING POLYSILOXANES AND FURTHER POLYMERS

(75) Inventors: Harald Chrobaczek, Augsburg (DE); Ralf Goretzki, Stadtbergen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 136 days.

(21) Appl. No.: 10/479,549

(22) PCT Filed: May 23, 2002

(86) PCT No.: PCT/EP02/05628

§ 371 (c)(1),
(2), (4) Date: Dec. 3, 2003

(87) PCT Pub. No.: WO02/100950

PCT Pub. Date: Dec. 19, 2002

(65) Prior Publication Data

US 2004/0144950 A1    Jul. 29, 2004

(30) Foreign Application Priority Data

Jun. 8, 2001 (EP) ................... 01114061

(51) Int. Cl.
  *C08L 83/04* (2006.01)
  *D06M 15/643* (2006.01)
(52) U.S. Cl. ............. 252/8.61; 106/287.1; 106/287.13; 106/287.14; 106/287.15; 252/8.62; 252/8.63
(58) Field of Classification Search ............ 106/287.1, 106/287.13, 287.14, 287.15; 252/8.61, 8.62, 252/8.63
See application file for complete search history.

(56) References Cited

U.S. PATENT DOCUMENTS

| 4,004,059 A | 1/1977 | Deiner et al. ............... 428/224 |
| 4,054,592 A | 10/1977 | Dear et al. .................... 560/25 |
| 4,247,592 A | 1/1981 | Kalinowski ................. 428/266 |
| 4,531,736 A * | 7/1985 | Sahler .......................... 428/96 |
| 4,620,878 A | 11/1986 | Gee ...................... 106/287.15 |
| 4,625,010 A | 11/1986 | Huhn et al. ..................... 528/31 |
| 4,742,140 A | 5/1988 | Greenwood et al. ........ 526/245 |
| 4,781,844 A | 11/1988 | Kortmann et al. ........... 252/8.6 |
| 4,834,764 A | 5/1989 | Deiner et al. .............. 8/115.64 |
| 5,019,428 A | 5/1991 | Lüdemann et al. ......... 427/387 |
| 5,057,572 A | 10/1991 | Chrobaczek et al. ........ 524/588 |
| 5,214,121 A | 5/1993 | Mosch et al. ................. 528/49 |
| 5,508,370 A | 4/1996 | Reiff et al. .................... 528/45 |
| 6,080,830 A | 6/2000 | Dirschl et al. ................ 528/45 |
| 6,387,999 B1 | 5/2002 | Dirschl et al. ............. 524/537 |
| 6,518,389 B1 | 2/2003 | Kaufhold et al. ............. 528/59 |
| 2002/0058777 A1 | 5/2002 | Brauer et al. ................. 528/44 |

FOREIGN PATENT DOCUMENTS

| EP | 0295422 | 12/1988 |
| EP | 0348350 | 12/1989 |
| EP | 0467083 | 1/1992 |
| EP | 0636155 | 2/1995 |
| JP | 10-245783 A * | 9/1998 |
| WO | WO 01/40378 A1 * | 6/2001 |

* cited by examiner

Primary Examiner—Anthony J. Green
(74) Attorney, Agent, or Firm—Kevin T. Mansfield

(57) ABSTRACT

Aqueous dispersions comprising polyorganosiloxanes having relatively long alkyl groups and having aromatic groups and also polymers having perfluoroalkyl groups or fluorine-free polyurethanes are useful for treating textile fabrics.

14 Claims, No Drawings

COMPOSITIONS COMPRISING POLYSILOXANES AND FURTHER POLYMERS

This invention relates to compositions, especially in the form of aqueous dispersions. These comprise a polyorganosiloxane which contains alkyl groups and aromatic groups in side chains. The aqueous dispersions further comprise a fluoropolymer or a polyurethane. This invention further relates to the use of these dispersions for treating fiber materials.

It is known to treat fiber materials, for example textile fabrics, with aqueous dispersions of polyorganosiloxanes as part of the finishing operation. Textiles can aquire a pleasantly soft hand and/or water-repellent properties as a result.

Polysiloxanes containing alkyl groups and aromatic groups are already known, for example from EP-B 636 155. The polysiloxanes mentioned therein are suitable for manufacturing contact lenses and contain unsaturated hydrocarbon radicals at both chain ends. Such polysiloxanes are unsuitable for the treatment of textile fiber materials in a number of cases because of the reactivity of the carbon-carbon multiple bonds.

It is further known to treat textiles with aqueous dispersions comprising polyorganosiloxanes and polymers containing perfluoroalkyl ($R_F$) groups. $R_F$-containing polymers can impart oil-repellent properties to textile fabrics. For instance, U.S. Pat. No. 4,004,059 describes polyorganosiloxanes which, in combination with polymers containing fluorine atoms, are suitable for treating textile fabrics. The polysiloxanes mentioned therein contain relatively long-chain alkyl groups, but no aromatic groups. The disadvantage of these polysiloxanes is that in a number of cases it is difficult or impossible to obtain stable aqueous dispersions comprising these polysiloxanes with or without fluoropolymers. This typically becomes all the more apparent the longer the alkyl chain present as a side chain to the polysiloxane chain.

WO 99/52965 discloses polysiloxanes containing aromatic groups which are attached to silicon atoms via alkylene bridges. They are used for compositions in the cosmetics or perfume sector. As well as the aralkyl groups mentioned, they may further contain alkyl groups having a chain length of up to eight carbon atoms. The use of the described polyorganosiloxanes for treating fiber materials and compositions which, as well as the polysiloxanes, comprise an $R_F$-containing polymer or a polyurethane are not described in this reference.

U.S. Pat. No. 4,625,010 describes polysiloxanes which, together with fluorine-containing polymers, are suitable for treating textiles. The polysiloxanes contain epoxy units as well as alkyl and aryl groups. The disadvantage of these polysiloxanes resides in the presence of epoxy units, which are in many cases undesirable for textile finishing because of their reactivity. In addition, their synthesis requires the use of epoxy-containing starting materials, which constitutes a disadvantage on account of the handling of epoxy compounds.

It is an object of the present invention to provide a composition which does not have the abovementioned disadvantages and which in the form of aqueous dispersions is very useful for treating fiber materials, especially textile fabrics.

This object is achieved by a composition comprising the following components:

A) a dispersant or a mixture of dispersants,
B) an unbranched polyorganosiloxane which contains no epoxy groups and no olefinic carbon-carbon double bonds and no carbon-carbon triple bonds, which is terminated, at both ends of the polysiloxane chain, by units of the formula

R$_3$Si—O— and which contains, within the polysiloxane chain, units of the formulae (I), (II) and optionally (III)

—SiRR$^1$—O—     (I)

—SiRR$^2$—O—     (II)

—SiR$_2$—O—     (III)

which units of the formulae (I) to (III) may be randomly distributed along the chain, where each R radical is independently of the other R radicals a branched or unbranched alkyl radical of 1 to 4 carbon atoms,
each R$^1$ radical is independently of the other R$^1$ radicals a branched or unbranched alkyl radical of 6 to 24 carbon atoms,
and each R$^2$ radical is independently of the other R$^2$ radicals a radical of the formula (IV)

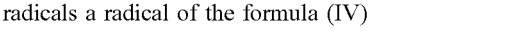
—R$^3$-Ph,     (IV)

where R$^3$ is a divalent branched or unbranched alkylene radical of 2 to 6 carbon atoms and Ph is an unsubstituted phenyl radical or is a phenyl radical substituted by one or more branched or unbranched alkyl groups of 1 to 4 carbon atoms, and C) a polymer selected from the group consisting of polymers containing perfluoroalkyl ($R_F$) groups (component C1) and fluorine-free polyurethanes (component C2).

Compositions according to the invention can optionally be present in the form of a dispersion or solution in an organic solvent and be used for example for the solvent coating of textiles, in which case they additionally comprise customary additives known from the technology of solvent coating. However, a preferred embodiment comprises their presence in the form of aqueous dispersions and their use as such. For this reason, the statements which follow relate to compositions according to the invention which are in the form of aqueous dispersions.

Dispersions according to the invention have the following advantages:

a) They can be prepared, by generally customary methods and by using known dispersants, in the form of very stable aqueous dispersions which are very useful for treating textile fabrics, especially wovens and knits.

b) They confer a pleasantly soft hand and water-repellent properties on textile fiber materials.

c) They are in the form of stable aqueous dispersions which comprise a component C1), ie one or more polymers containing perfluoroalkyl ($R_F$) groups, very useful for treating textile fiber materials which may thereby be given a soft hand and also oil- and water-repellent properties.

d) When they contain one or more fluorine-free polyurethanes (component C2)), they are useful for coating textile fiber materials, in which case the dispersions normally additionally comprise thickeners and are preferably used in the form of highly viscous liquids or pastes.

Preferably, dispersions according to the invention comprise as component C) only one or more components C1), ie one or more polymers which fall within the definition of C1), but no component C2), or they comprise only one or more components C2), but no component C1). In the first case, they are very useful for the oil- and water-repellent finishing of textile fabrics, for example by padding. The textiles additionally acquire a pleasantly soft hand as a result. In the second case, the dispersions are particularly useful for coating textile fabrics and preferably comprise further ingredients such as thickeners, for example.

It has been determined that the polyorganosiloxanes suitable as component B) will lead to the aforementioned advantages to a marked extent when they contain aromatic groups ($R^2$) in side chains to the polysiloxane chain as well as relatively long-chain alkyl groups ($R^1$). In the absence of an aromatic group in component B), the preparation of stable aqueous dispersions is frequently very difficult, if not impossible, especially when the number of carbon atoms in the $R^1$ radical increases. The absence of $R^1$ radicals does not lead to an ideal soft hand nor frequently to ideal water-repellent properties for finished textiles.

The polyorganosiloxanes used as component B) of dispersions according to the invention are unbranched. This means that the polyorganosiloxane chain has side chains ($R^1$ and $R^2$), but no side chains containing silicon atoms.

The polyorganosiloxanes (component B) contain no epoxy groups, no olefinic carbon-carbon double bonds and no carbon-carbon triple bonds. The presence of such reactive groups would compromise usefulness for a number of applications. Nor, for the same reason, do the polyorganosiloxanes preferably contain any Si—H bonds with the exception of low fractions due to their synthesis (which is preferably carried out using siloxanes having Si—H bonds as starting materials). The presence of polyoxyethylene groups in the polyorganosiloxanes is likewise less preferable, since the water-repellent properties of finished textiles can be compromised as a result. However, the polyorganosiloxanes included in compositions according to the invention can still contain minor fractions of Si—OH bonds which are present in the form of by-products from the synthesis.

The polyorganosiloxanes used as component B) of dispersions according to the invention have at each chain end a unit of the formula $$R_3Si—O—.$$

Each R radical is independently of the other R radicals a branched or unbranched alkyl radical of 1 to 4 carbon atoms. Preferably, each R radical is methyl. This definition for R and for the preferred embodiment whereby all R radicals are methyl groups also applies to the hereinbelow described units of the formulae (I), (II) and (III).

The polysiloxane chain of component B) contains internal units of the formula (I), of the formula (II) and optionally additionally of the formula (III). These individual units can be randomly distributed along the polysiloxane chain.

In the units of the formulae (I) and (II), the $R^1$ and $R^2$ radicals respectively are present as side chains to the polysiloxane chain.

Each $R^1$ radical is independently of the other $R^1$ radicals a branched or unbranched alkyl radical of 6 to 24 carbon atoms. Preferably each $R^1$ radical is an unbranched alkyl radical of 10 to 18 carbon atoms.

Each $R^2$ radical is independently of the other $R^2$ radicals a radical of the formula (IV)

$$—R^3\text{-Ph} \quad (IV)$$

where $R^3$ is a divalent branched or unbranched alkyl radical of 2 to 6 carbon atoms and Ph is either unsubstituted phenyl or a phenyl substituted on the aromatic ring by one or more branched or branched alkyl groups having 1 to 4 carbon atoms. Preferably, each $R^2$ radical is $$—CH_2—CHR^4\text{-Ph}$$

where $R^4$ is hydrogen or a methyl group and Ph is unsubstituted phenyl.

Preferred dispersions according to the invention are characterized in that in component B), the number of units of the formula (II) is 4 to 30% of the number of units of the formula (I) and the number of units of the formula (III) is 0 to 5 000% and preferably 0 to 1 000% of the number of units of the formula (I).

The numbers of the individual units can be controlled by the amounts of the starting compounds used in the synthesis of the polysiloxanes. A suitable method of synthesis is described hereinbelow.

A further preferred embodiment of dispersions according to the invention is characterized in that component B) contains 20 to 1 000 and preferably 20 to 100 silicon atoms.

The preparation of polysiloxanes useful as component B) can be effected by the following method:

The starting material used is a polysiloxane which has a radical of the formula $R_3Si—O—$ at each chain end and which, in the chain, contains only units of the formula —Si(R)H—O— and optionally of the formula
—SiR$_2$—O—.

Such polysiloxanes (hydrosiloxanes) are commercially available; an example is the "Finish WS 61 M" product (from Wacker, Germany) or the "HMS 301" product (from ABCR GmbH, Germany). To prepare polyorganosiloxanes according to the invention, the hydrosiloxane mentioned is reacted not only with a monoolefin of 6 to 24 carbon atoms but also with an aromatic compound. The C═C double bond of the $C_6$–$C_{24}$-monoolefin can be terminal or internal to the hydrocarbon chain; preferably it is terminal. The aromatic compound contains a benzene nucleus which is substituted by at least one substituent. This substituent is a linear or branched hydrocarbon radical of 2 to 6 carbon atoms which contains one C═C double bond. In addition, the aromatic compound can be substituted on the benzene nucleus by one or more linear or branched alkyl groups of 1 to 4 carbon atoms.

Of particular use for preparing polysiloxanes by the abovementioned processes are monoolefins of 10 to 18 carbon atoms, especially those having a terminal olefinic double bond. An example is 1-dodecene. As to aromatic compounds, styrene and α-methylsytrene are particularly suitable.

Suitable choice of the type and amount of the starting substances mentioned and of the conditions for the synthesis makes it possible to influence the structure of the resulting polyorganosiloxanes in a specific manner, for example with regard to the number of units of the formulae (I), (II) and (III) and with regard to the total number of silicon atoms.

In the reaction mentioned, the hydrosiloxane can be reacted with the monoolefin and the aromatic compound simultaneously. However, it is also possible for the hydrosiloxane to be reacted first with one of these compounds and then with the other. In the reaction, the Si—H group adds to the respective olefinic C═C double bond to form the $R^1$ and $R^2$ radicals in the polysiloxanes according to the invention. Preferably, the reaction is carried out with such amounts of starting materials and under such conditions that the resulting product mixture contains Si—H bonds and olefinic double bonds only to an insignificant extent, if at all.

The reaction can be carried out under conditions generally known from hydrosiloxane chemistry.

Polysiloxanes useful as component B) are likewise commercially available. One example is the TEGOPREN 6870 product (from Goldschmidt, Germany).

Component B) of dispersions according to the invention, as well as units of the formulae (I), (II) and optionally (III), may additionally contain amino-containing radicals, especially radicals of the formula

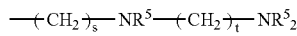

$$-(CH_2)_s-NR^5-(CH_2)_t-NR^5_2$$

which are each attached to one silicon atom and in which s is from 2 to 6, preferably 3, t is from 2 to 6, preferably 2, and each $R^5$ radical is independently of the other $R^5$ radicals hydrogen or an alkyl group of 1 to 4 carbon atoms. The introduction of such radicals into component B) is accomplished by reacting, in the course of the above-described synthesis, the hydrosiloxane not only with an olefin and an aromatic compound, but additionally with an unsaturated aliphatic amine, for example allylamine or N-(2-aminoethyl) allylamine. The reaction with the allylamine can take place simultaneously with the reaction with olefin and aromatic compound or beforehand or afterwards.

Preferably, component A) (dispersant or dispersant mixture) of dispersions according to the invention is exclusively selected from nonionic surface-active compounds. Suitable dispersants will be known to one skilled in the art of silicone emulsions and are commercially available. Especially ethoxylated fatty alcohols or ethoxylated fatty acids may be mentioned in this context, for example those having 8 to 18 carbon atoms in the alkyl radical which can be linear or branched, or having 6 to 20 polyoxyethylene units. These ethoxylates can be terminated at one end of the chain by an OH group or an OR group, where R is an alkyl of 1 to 4 carbon atoms, especially $CH_3$.

If desired, dispersions according to the invention can be prepared by mixing an aqueous dispersion of a component B) with an aqueous dispersion of a component C1) or a component C2), provided at least one of these dispersions already contains component A). Since the commercially available dispersions of a component C1) or of a component C2) can contain ionic, for example cationic, dispersants, it will be appreciated that their use means that the resulting dispersions according to the invention also contain ionic dispersants.

Dispersions according to the invention, as well as the above-described components A) and B), additionally contain a component C). Component C) can be a polymer or a mixture of polymers which contains perfluoroalkyl ($R_F$) groups; such polymers will hereinafter be referred to as component C1). They can also be a fluorine-free polyurethane or a mixture of such polyurethanes which hereinafter is referred to as component C2). Preferably, dispersions according to the invention contain as component C) either only polymers which fall within the definition of C1) and are preferably used for padding textile fabrics; or else they contain as component C) only polyurethanes as per the definition of C2) and are preferably used for coating textile fabrics. In either case the textile fabrics preferably take the form of wovens or knits.

Preferably, dispersions according to the invention comprise 0.5 to 10% by weight of component A), 0.5 to 30% by weight of component B), 3 to 30% by weight of component C) and 30 to 96% by weight of water.

Component C1) is preferably a polyester having $R_F$ groups, a polyurethane having $R_F$ groups, a polyacrylate having $R_F$ groups or a mixture thereof. Such polymers are commercially available, an example being the ZONYL products (from Du Pont).

Useful polyacrylates having $R_F$ groups include in particular homopolymers or copolymers obtainable from monomers of the formula

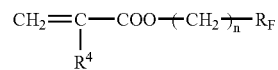

$$CH_2=C-COO-(CH_2)_n-R_F$$
$$\quad\quad |$$
$$\quad\quad R^4$$

where $R^4$ is H or $CH_3$, n is from 2 to 6 and $R_F$ is a perfluoroalkyl radical of the formula

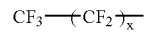

$$CF_3-(CF_2)_x-$$

where x is from 5 to 19. Here it is normal to use a mixture of acrylates of this formula whose individual compounds differ in the chain length of $R_F$. Copolymers based on the abovementioned monomer which are highly suitable for use as component C1) are obtainable by copolymerizing this monomer with one or more of the following monomers: vinyl chloride, vinylidene chloride, butyl acrylate, butyl methacrylate, stearyl (meth)acrylate. Suitable $R_F$-containing polyacrylates are also described in U.S. Pat. No. 4,742,140. Polyurethanes having $R_F$ groups and being highly suitable for use as component C1) are obtainable by reacting diols which contain one or more $R_F$ groups with diisocyanates. Fluorine-free diols may additionally be used in this reaction as chain extenders, examples of the fluorine-free diols which can be used being N-methyldiethanolamine or polyglycols. A particularly suitable $R_F$-containing diol is a product of the formula

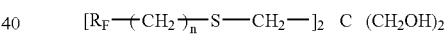

$$[R_F-(CH_2)_n-S-CH_2-]_2\ C\ (CH_2OH)_2$$

where $R_F$ is as defined above and n is from 2 to 6. It is normal here to use a mixture of diols of this formula whose individual compounds differ in the chain length of $R_F$. These diols and their preparation and also the preparation of $R_F$ polyurethanes are described in the literature, for example in EP-A 459 125 and EP-A 348 350. Further suitable $R_F$ diols and their reaction with diisocyanates to form $R_F$-containing polyurethanes are described in EP-A 1 088 929 (component B) of claim 1) and in U.S. Pat. No. 4,054,592.

$R_F$-containing polyesters which are highly suitable for use as component C1) are known and are described for example in EP-A 1 088 929 (component A) of claim 1). Particularly suitable polyesters are obtainable from the abovementioned preferred $R_F$ diols and aliphatic dicarboxylic acids such as adipic acid for example.

As component C1) it is also possible to use $R_F$-containing polyurethanes which are copolymers having urethane and having siloxane units. Such polymers are described in EP-A 325 918 and EP-A 467 083.

Component C2) of dispersions according to the invention is a fluorine-free polyurethane. Polyurethanes useful for this purpose are preparable from diols and diisocyanates by methods which are common knowledge from polyurethane chemistry. Preference is given to using polyurethanes which no longer contain any free isocyanate groups, which is controllable via the preparative conditions, for example through the use of a certain excess of diol OH groups over diisocyanate isocyanate groups.

Polyurethanes which are very useful as component C2) are obtainable from the following diols by reaction with diisocyanates: ethylene glycol and its homologues of 3 to 50 carbon atoms such as for example low molecular weight diols or polyethylene glycols having a molecular weight of 400 to 800. The carbon chains of the diols can be linear or branched. It is also possible to use mixtures of such diols in the preparation.

The reaction with diols to form polyurethanes useful as component C2) can be carried out with aliphatic, cycloaliphatic or aromatic diisocyanates. Examples which are very useful are hexamethylene 1,6-diisocyanate, trimethylhexylmethylene 1,6-diisocyanate (for example as mixture of isomers), 2,4-tolylene diisocyanate, 2,6-tolylene diisocyanate or a mixture thereof. Polyurethanes of the kind mentioned are commercially available.

Polyurethanes which are particularly useful as component C2) are polyester urethanes. These contain polyester units in the polymer chain as well as urethane units. They are preparable by known methods by reacting polyesters which have free OH groups at the chain ends with diisocyanates. Diols are advantageously additionally used in this reaction as chain extenders. Useful diols and diisocyanates for this reaction include the compounds already described above. The polyesters having free OH end groups that are used for the synthesis can be aliphatic or aromatic compounds. Highly suitable polyesters are obtainable by reacting terephthalic acid, phthalic acid or an aliphatic dicarboxylic acid of 2 to 6 carbon atoms with an excess of diol. The diol used for this purpose can again be of the type described above. The preparation of polyester urethanes which are very useful as component C2) is described for example in EP-A 1 055 692, EP-A 1 010 712 and EP-A 295 422.

Useful polyester urethanes are commercially available in the form of aqueous dispersions. These dispersions which, as well as polyester polyurethanes (component C2), additionally contain dispersants are generally ready to use for the preparation of dispersions according to the invention without prior isolation of the polyester polyurethane. Examples of such commercial products are IMPRANIL DLN Dispersion W 50 (from Bayer AG) and BAYDERM Grund 10 UD (from Bayer AG).

If desired, dispersions according to the invention can contain further components of the kind customarily used for treating textile fabrics. Examples thereof are flame retardants or cellulose crosslinkers. Also, further polyorganosiloxanes can be present besides component B). These should be substantially free of carbon-carbon multiple bonds, of epoxy groups, of polyalkylene oxide groups and of Si—H bonds. Polyorganosiloxanes useful for this purpose include polydimethylsiloxanes having $(CH_3)_3Si$—O— end groups or polydimethylsiloxanes where one or more methyl groups in the polymer chain (but not two methyl groups on the same silicon atom) are replaced by amino-containing radicals. These radicals are preferably the above-described radicals of the formula

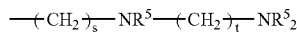

Such amino-functional polysiloxanes are known from the prior art and can be prepared from hydrosiloxanes and unsaturated amines, for example allylamines. Useful products of this kind are obtainable from Wacker, Germany, and from Dow Corning. Suitable commercially available amino-functional polysiloxanes are either already in the form of aqueous dispersions or can be converted into aqueous dispersions by generally known methods. These aqueous dispersions can be added to dispersions according to the invention. Suitable amino-functional polysiloxanes and aqueous dispersions thereof are described in U.S. Pat. No. 4,247,592, EP-A 138 192 and WO 88/08436.

It is frequently of advantage for dispersions according to the invention which contain a component C1) to additionally contain an extender or a mixture of extenders. Extenders enhance the oil/water-repellent properties of textiles finished with fluoropolymers and so make it possible for an effective performance level to be achieved even at comparatively low use levels of (costly) fluoropolymers.

Extenders and their use in the treatment of textiles with fluoropolymers are known from the prior art. Useful extenders are in particular compounds which contain reversibly blocked isocyanate groups. These reversibly blocked isocyanates are converted back to free isocyanate groups at elevated temperature. Useful blocking agents include in particular ketone oximes, for example butanone oxime.

Useful extenders are in particular aliphatic, cycloaliphatic and aromatic compounds having two or more blocked isocyanate groups, for example hexamethylene diisocyanate, trimethylhexamethylene diisocyanate, diphenylmethane 4,4'-diisocyanate, each after blocking of the NCO groups.

Useful extenders are described in EP-A 872 503 (claim 1), EP-A 537 578 (claim 1) and WO 86/02115.

Useful extenders further include commercially available products after the free isocyanate groups of these products have been blocked, for example by reaction with a ketone oxime. Examples of such commercial products are BAYGARD EDW and DESMODUR L 75 (NCO-containing polyurethanes from Bayer, Germany) and also "isophorone diisocyanate" (=1-methyl, 1-isocyanatomethyl-, 3-isocyanato-5,5-dimethylcyclohexane).

When dispersions according to the invention which contain a component C1) are to additionally contain an extender, the extender is preferably added in such amounts that the weight ratio of component C1) to extender is in the range from 1:0.1 to 1:1.5, especially in the range from 1:0.2 to 1:0.8.

Dispersions according to the invention can be prepared by generally known methods. One way is to initially charge a mixture of water and component A) (dispersant), to add the other components and then to mechanically homogenize. Normally, stable dispersions are obtainable at room temperature, but in certain circumstances a somewhat elevated temperature may be required.

Dispersions according to the invention which contain the components A), B) and C1) as well as water are especially useful for pad-mangle application to textile fabrics such as wovens or knits composed of cotton, synthetics such as polyester or nylon, or blends thereof. The textile fabrics thus finished are useful for manufacturing garments or home textiles. Application via pad-mangle and further processing of finished textiles can be effected in accordance with customary processes.

Dispersions according to the invention which contain the components A), B) and C2) as well as water are useful for coating textile fabrics such as for example wovens composed of cotton, linen, synthetics such as polyester or nylon or fiber blends for final articles such as fashionable coated clothing. To this end, the dispersions are normally admixed with thickeners, as is customary for coating processes. In addition, foam-inhibiting products can be used in the preparation of the dispersions.

A suitable coating recipe is obtainable for example by admixing 1 000 parts by weight of an aqueous dispersion containing the components A), B), C2) and water with 5 parts by weight of a defoamer, followed by a thickener in such an amount as to provide a highly viscous liquid or a pasty consistency of the kind customarily used for coating operations. An example of a useful defoamer is the DIC-RYLAN-Entschäumer D product from Ciba Spezialitätenchemie Pfersee GmbH, Germany, a composition based on a hydrocarbon mixture. Silicone defoamers can also be used.

Useful thickeners include polyacrylate-based products such as DICRYLAN-Verdicker TFC or DICRYLAN-Verdicker R (Ciba Spezialitatenchemie Pfersee GmbH, Germany). In the case of the use of DICRYLAN-Verdicker R, the pH should be adjusted to a weakly basic value, for example by means of ammonia. Coating and further processing can be carried out in accordance with the customary processes.

The examples hereinbelow illustrate the invention.

EXAMPLE 1

Preparation of a Component B) (polyorganosiloxane)

A three-neck flask was charged with 60 g of hydrosiloxane (see below for structure), 100 g of 1-dodecene and 8 g of α-methylstyrene. 1 ml of a mixture of 37 g of 1-dodecene and 0.5 g of a catalyst was added with stirring while $N_2$ was passed in. In the process, the temperature of the mixture rose from room temperature to about 120° C. The remainder of the mixture of 1-dodecene and catalyst was then added at 80° C. The time over which the total amount of this mixture was added was about 70 minutes. The product mixture was subsequently stirred at 80° C. for a further 260 minutes or so.

This afforded a slightly yellow liquid having a viscosity of about 1 100 mPas (at 25° C.). The polyorganosiloxane present in the liquid had a unit of the formula $(CH_3)_3Si$—O— at each chain end and contained units of the formula —$Si(CH_3)(—C_{12}H_{25})$—O— and units of the formula —$Si(CH_3)(—CH_2—CH(CH_3)—C_6H_5)$—O— within the chain.

The abovementioned catalyst was a solution of a platinum (0) complex of 1,3-divinyl-1,1,3,3-tetramethyldisiloxane in isopropanol. This solution contained about 1% of Pt. The hydrosiloxane (from Wacker, Germany) had the following structure:

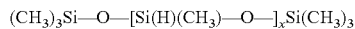

$(CH_3)_3Si$—O—$[Si(H)(CH_3)$—O—$]_xSi(CH_3)_3$ where x is about 40.

EXAMPLE 2

Preparation of an Aqueous Dispersion of a Component B)

175 g of the product obtained according to example 1 were introduced into a mixture of 20 g of water and 15 g of an ethoxylated $C_{10}/C_{14}$ alcohol (about 6 polyoxyethylene units). The mixture was homogenized by vigorous stirring at room temperature, after which 290 g of water and 0.5 g of a bactericide were added. This afforded a stable opalescent aqueous dispersion (="dispersion 1").

EXAMPLE 3

Preparation of an Aqueous Dispersion of a Component B) and of an Amino-Functional Polysiloxane 18 g of an amino-functional polysiloxane (Q2-8630, Dow Corning) and 157 g of the reaction product obtained as per example 1 were introduced into a solution of 15 g of ethoxylated $C_{10}/C_{14}$ alcohol (see example 2) in 20 g of water and the mixture obtained was homogenized by vigorous stirring at room temperature. 2.5 g of a 60% solution of acetic acid in water were then added, followed by 290 g of water and 0.5 g of a bactericide. Renewed homogenization provided a stable opalescent aqueous dispersion (="dispersion 2").

EXAMPLE 4

(Noninventive, Comparative Example)

This example constitutes an attempt to obtain a stable aqueous dispersion of a polysiloxane which contained comparatively long alkyl radicals but no aromatic groups in side chains. To this end, 45 g of hydrosiloxane (see example 1) were added over 70 minutes to a mixture containing 111 g of 1-dodecene and 0.6 g of catalyst based on a platinum complex of divinylsiloxane. The mixture was subsequently stirred at 80° C. for 2.5 hours under $N_2$. This provided a yellowish liquid having a viscosity of about 700 mPa.s (at 25° C.). 126 g of the product mixture thus obtained were stirred into a solution of 11 g of ethoxylated alcohol (see example 2) in 15 g of water. 208 g of water and 0.4 g of bactericide were then added. It proved impossible to obtain a stable dispersion even after prolonged intensive stirring.

EXAMPLE 5

Preparation of an Aqueous Dispersion According to the Invention 0.5 g of an ethoxylated alcohol (alkyl chain on average 13 carbon atoms and 20 polyoxyethylene units) was dissolved in 4 g of water with stirring and the mixture was heated to 60° C.

1.5 g of the ethoxylated alcohol described in example 2 were then added and the mixture was stirred at 60° C. until a clear solution had formed. This solution was cooled to 30° C., at which point 48 g of an aqueous polyurethane dispersion and 48 g of dispersion 1 obtained as per example 2 were added with stirring. This provided a milky dispersion which was very stable even after 30 days of storage at 40° C. or at room temperature and which, after addition of a thickener, was very useful for coating textile fiber materials.

The aqueous polyurethane dispersion used was the DICRYLAN PSC product (from Ciba Spezialitatenchemie Pfersee GmbH, Germany) and contained 70% of water and 30% of a polyester urethane based on an aliphatic diisocyanate and a polyester based on a mixture of an aromatic and an aliphatic dicarboxylic acid and an aliphatic diol, the polyester still containing free OH groups.

Useful thickeners for preparing a coating recipe include the acrylate-based polymers mentioned above in the description part.

EXAMPLE 6

Preparation of a Dispersion According to the Invention

The hereinbelow described products a) to e) were mixed with each other at room temperature and the mixture was homogenized by stirring.

a) 107 g of an aqueous beige-colored dispersion comprising 16% by weight of an acrylic copolymer which contained $R_F$ groups, 3% by weight of an aliphatic diol of 6 carbon atoms, 1.5% by weight of polyethylene glycol monostearate and 80% by weight of water.

b) 107 g of an aqueous dispersion comprising 14% by weight of a polyurethane which contained $R_F$ groups, 7% by weight of a butanone oxime blocked polyisocyanate, 1.5% by weight of an ethoxylated isotridecyl alcohol containing 10 EO units on average, 0.7% by weight of polyoxyethylenestearylmethylammonium chloride, 3% by weight of 1,2-propanediol, 0.1% by weight of HCl, remainder water.

The $R_F$-containing polyurethane used for this purpose was a product obtained by reaction of

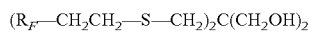
$(R_F-CH_2CH_2-S-CH_2)_2C(CH_2OH)_2$ with trimethylhexamethylene diisocyanate (mixture of isomers). The $R_F$ radicals conformed to the formula

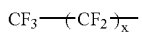
$CF_3-(CF_2)_x-$ where x is on average in the range from 7 to 11.

The butanone oxime blocked polyisocyanate was prepared on the basis of

$R(C_7H_{15})(-C_9H_{18}-NCO)_2(C_5H_{11})$ where R is the tetravalent radical formed from cyclohexane by removal of 4 hydrogen atoms.

c) 12 g of dispersion 1 as per example 2
d) 12 g of isobutyl ether of a reaction product of tallow fatty amine, urea and formaldehyde
e) 12 g of water This provided a stable aqueous dispersion (="dispersion 3")

EXAMPLE 7

Example 6 was repeated, except that product c) was not dispersion 1 but 12 g of dispersion 2 as per example 3. This provided a stable dispersion (="dispersion 4")

EXAMPLE 8

The hereinbelow described products f) to j) were mixed at room temperature and the mixture was homogenized by stirring.

f) 80 g of product a) of example 6
g) 80 g of an aqueous dispersion comprising 15% by weight of an $R_F$-containing acrylic polymer, 2% by weight of polyoxyethylene glycol monostearate, 8% by weight of acetone, 5% by weight of an aliphatic diol of 6 carbon atoms and 70% by weight of water
h) 15 g of dispersion 1 as per example 2
i) 15 g of product d) of example 6
j) 10 g of water This again provided a stable aqueous dispersion (="dispersion 5")

EXAMPLE 9

Example 8 was repeated, except that product h) was not dispersion 1 but 15 g of dispersion 2 as per example 3. The result was a stable dispersion (="dispersion 6").

EXAMPLE 10

Finishing Tests on Wovens Composed of 100% Cotton and on Polyester-Cotton Blend Fabrics Dispersions 3 and 4 as per examples 6 and 7 were padded onto wovens composed of 100% cotton and onto wovens composed of (40:60) cotton-polyester. The liquor concentrations used were 10 g/l, 20 g/l and 40 g/l. After liquor application, the fabrics were squeezed off to about 80% wet pick-up, dried (10 min/110° C.) and cured (5 min/150° C.).

The comparison in each case was a woven fabric to which there was applied a dispersion which corresponded to dispersion 3 of example 6, except that product c) (=dispersion 1) had not been added. Instead, this comparative dispersion included 12 g of an aqueous dispersion containing 35% of a polyorganosiloxane and 3% by weight of a dispersant ($C_{10}$/$C_{14}$ alcohol ethoxylated, about 6 EO units). The polyorganosiloxane used contained Si—H bonds and epoxy groups and also alkyl groups and aromatic groups in side chains.

Tests on the fabrics showed in the case of 100% cotton that the dispersions according to the invention led to substantially the same values with regard to oil repellency than the comparative fabric, but to distinctly better values with regard to water repellency (Bundesmann test). In the case of blend fabric, the corresponding results were somewhat better.

What is claimed is:

1. A composition comprising the following components:
   A) a dispersant or a mixture of dispersants,
   B) an unbranched polyorganosiloxane which contains no epoxy groups and no olefinic carbon-carbon double bonds and no carbon-carbon triple bonds, which is terminated, at both ends of the polysiloxane chain, by units of the formula

   $R^3Si-O-$ and which contains, within the polysiloxane chain, units of the formulae (I), (II) and optionally (III)

   $-SiRR^1-O-$ (I)

   $-SiRR^2-O-$ (II)

   $-SiR^2-O-$ (III)

which units of the formulae (I) to (III) may be randomly distributed along the chain,
   where each R radical is independently of the other R radicals a branched or unbranched alkyl radical of 1 to 4 carbon atoms,
   each $R^1$ radical is independently of the other $R^1$ radicals a branched or unbranched alkyl radical of 6 to 24 carbon atoms,
   and each $R^2$ radical is independently of the other $R^2$ radicals a radical of the formula (IV)

   $-R^3$-Ph (IV)

where $R^3$ is a divalent branched or unbranched alkylene radical of 2 to 6 carbon atoms and Ph is an unsubstituted phenyl radical or is a phenyl radical substituted by one or more branched or unbranched alkyl groups of 1 to 4 carbon atoms, and
   C) a polymer selected from the group consisting of polymers containing perfluoroalkyl ($R_F$) groups (component C1) and fluorine-free polyurethanes (component C2).

2. A composition according to claim 1, characterized in that each R in component B) is methyl.

3. A composition according to claim 1, characterized in that each $R^1$ radical in component B) is independently of other $R^1$ radicals an unbranched alkyl radical of 10 to 18 carbon atoms.

4. A composition according to claim 1, characterized in that each $R^2$ radical in component B) is

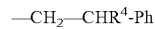
$-CH_2-CHR^4$-Ph where $R^4$ is hydrogen or a methyl group and Ph is unsubstituted phenyl.

5. A composition according to claim 1, characterized in that, in component B), the number of units of the formula (II) is 4 to 30% of the number of units of the formula (I) and the number of units of the formula (III) is 0 to 5 000% of the number of units of the formula (I).

6. A composition according to claim 1, characterized in that component B) contains 20 to 1 000 silicon atoms.

7. A composition according to claim 1, characterized in that it comprises 0.5 to 10% by weight of component A), 0.5 to 30% by weight of component B), 3 to 30% by weight of component C) and 30 to 96% by weight of water.

8. A composition according to claim 1, characterized in that component A) consists exclusively of nonionic compounds.

9. A composition according to claim 1, characterized in that component C) comprises either only one or more of components C1) or only one or more components C2).

10. A composition according to claim 1, characterized in that component C1) is a polyester, a polyurethane or a polyacrylate which contains $R_F$ groups.

11. A composition according to claim 1, characterized in that C2) is a polyester urethane.

12. composition according to claim 1, characterized in that it is an aqueous dispersion.

13. A method of treating fiber materials which comprises applying a dispersion according to claim 12 thereto.

14. The method according to claim 13, characterized in that the fiber materials are textile fabrics in the form of wovens or knits.

* * * * *